Patented Apr. 12, 1932

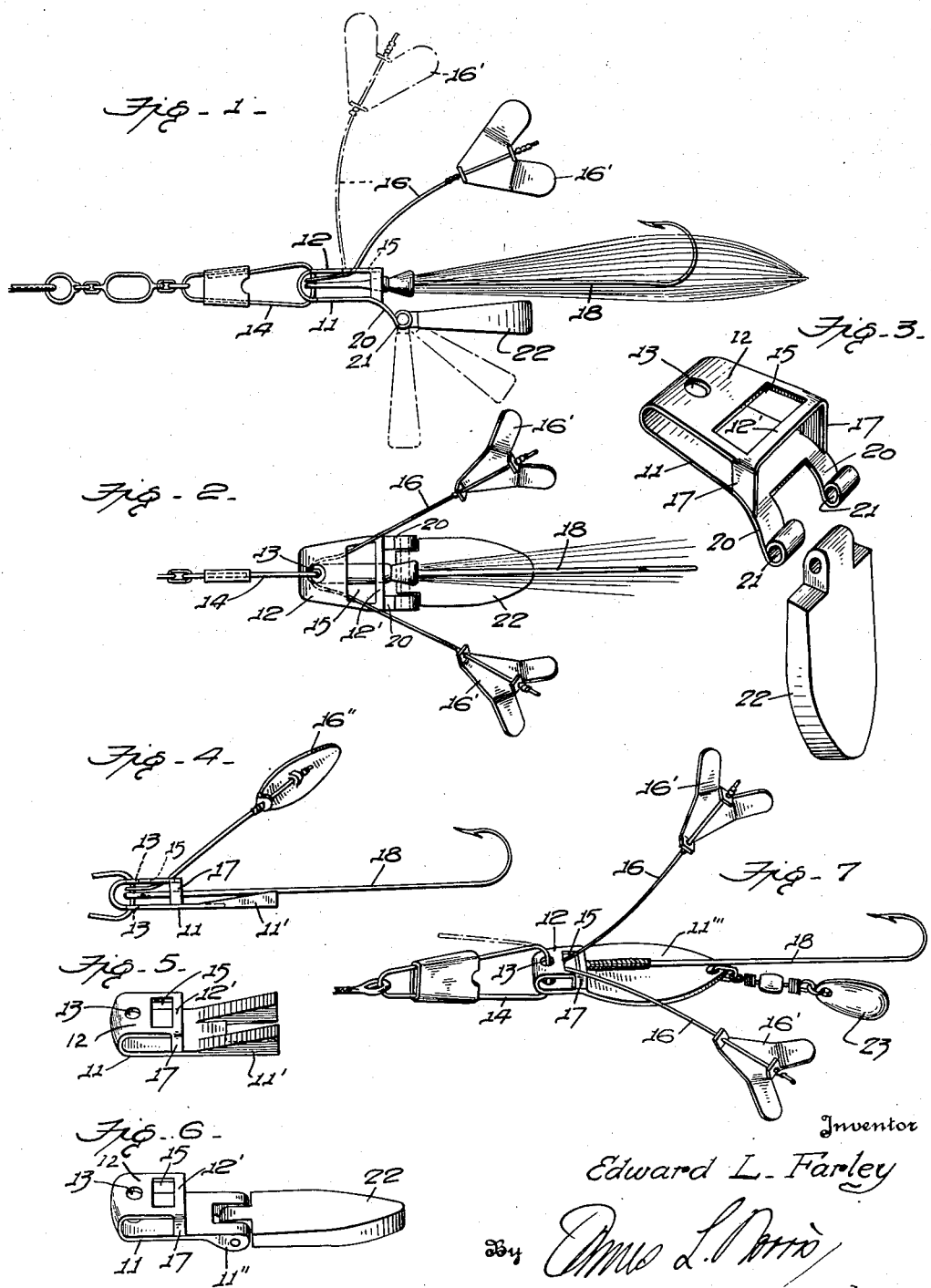

1,854,024

UNITED STATES PATENT OFFICE

EDWARD L. FARLEY, OF JONESBORO, ARKANSAS

FISH LURE

Application filed April 23, 1931. Serial No. 532,300.

My invention relates to fish lures and is an improvement on the one described and claimed in my prior Patent No. 1,731,161, for fish lures, dated October 8, 1929.

In my present invention I retain all the advantages of the patented device, and improvements are added which render the article simpler in construction, more effective in operation, and less expensive to manufacture.

One feature of my invention consists in the improved form of the body or support.

Another feature consists in the provisions made for a limited pivotal movement of the arms for the spinners or decoys, and another in the provisions made for a limited pivotal movement of the hook.

Still another feature resides in the manner of weighting the device so that it can be properly cast and will glide properly through the water and be held from turning upside down.

Other features consists in the combinations and details of construction disclosed in this specification and the accompanying drawings and set forth in the claims.

In the accompanying drawings,

Fig. 1 is a side elevation of a lure constructed according to my invention;

Fig. 2 is a top plan thereof;

Fig. 3 is a perspective view of the body or mounting and the weight which is to be pivoted thereto;

Fig. 4 is a side elevation of a modified form of my invention;

Fig. 5 is a perspective view of the weighted body of Fig. 4;

Fig. 6 is a perspective view of another form of weighted body, and

Fig. 7 is a perspective view of another modification.

Like numerals designate the same parts in all the figures.

The body or support is best shown in Fig. 3. This body is of substantially U-shape in vertical cross-section and comprises a bottom member 11 and a turned-over top member 12. The bottom member 11 may be weighted by any of the means hereinafter described. Aligned holes 13, 13 are formed in the top and bottom members near the ends where they are united to receive the end bar of a swiveled snap holder 14 or other form of connection at the end of the line. It is possible to dispense with this connection and secure the line directly to the body by passing the end of the line through holes 13 and securing its extremity to the adjacent portion of the line to form a loop. It is much better to use the snap, however, since it forms a substantially rigid pivot for the hook and other parts and avoids wearing out the line with the consequent danger of losing all the parts attached thereto as well as a fish on the hook.

In my improvement this one snap connects the body to all the parts, including line, feathered, hair or other type of clothed or unclothed hook, or hook and bacon rind, and the arms for carrying spinners, spoons or other forms of decoy, thus dispensing with separate connecting devices. When in place the snap forms a firm and secure fastener, and at the same time it permits freedom of motion for the hook and decoy arms and is easily and quickly detachable when it is desired to remove or change one of the parts.

In the top member 12 is an opening 15 through which the apex of the V-shaped or U-shaped structure constituting the arms 16 of the spinners 16', spoons 16'', or other form of decoys may be inserted to align with the holes 13 in the top and bottom members of the body. If desired, a coil may be formed at the U or V. Whether the coil is present or not, the structure is held in position by the snap 14, as shown in Figs. 1, 2, etc.

Not being secured to the hook, the decoy arms may be removed without removing the hook when it is desired to use the latter without the decoys.

The shape of the arms and the position of the opening 15 are such that the decoys are normally held at the desired position with respect to the hook, and when struck by a fish they will be thrown up, as shown in dotted lines in Fig. 1, until they are stopped by the edge of the opening opposite the bar 12'. When this occurs and the weighted bottom drops, the hook is exposed from above and below through practically its entire length.

I do not limit myself to the form of decoys shown in Figs. 1, 2 and 7. Any desired form may be used, such as the spoon 16″ of Fig. 4. I use the term "decoy" to include these or anything mounted on arms 16 which by its appearance or movement will attract fish to the neighborhood of the hook.

The top member 12 of the body is shown as having a portion 17 of each of its lateral edges bent at substantially a right angle thereto and bridging the space between said member and the bottom member 11. Preferably the rear edges of the portions 17 coincide with the rear end of the top member 12, and in order that said portions 17 may not add materially to the weight of the body, it is preferred that they be of less width than the length of the top member 12. When the hook 18 swings laterally in either direction one or the other of the portions 17 will contact with its shank 18 and thus prevent further lateral swing of the hook in that direction. It is obvious that the portion 17 may be formed as a part of either the top member 12 or the bottom member 11 of the body.

As shown in the drawings, the hook is normally positioned with its shank midway between the side edges of the body and its hook in a vertical plane. This is brought about by causing the end bar of snap 14 on which the hook is strung to assume a direction perpendicular to the bottom member 11. The bottom member 11 and top member 12 of the body will be approximately horizontal while being drawn through the water because said bottom member is weighted. A flat body without the top member would allow the snap and hook to turn over, and the device would lose much of its efficiency.

It will be seen from the above that the turned-back top 12 serves several important purposes. It furnishes an upper bearing for the end bar 12′, and thus holds the hook in a plane substantially perpendicular to the base; it provides the opening 15 to receive a decoy, the walls of which opening limit the movements of the spinner arms; and it carries the portions 17, which limit the movements of the hook. The bent end of the body with the end bar of the snap form in effect a clevis to which all the parts are attached.

If for any reason it is desirable to have the point of the hook below the shank, it is only necessary to open the snap, remove and reverse it and then replace and fasten it again by means of the snap.

A pair of arms 20 project from the rear end of the bottom member 11. Bearings or eyes 21 at the ends of these arms receive a hinge pintle on which is pivoted weight 22. Depending upon the speed at which it is drawn through the water, this weight will extend rearwardly from a substantially horizontal position to a position at an angle of 15 to 30 degrees from the horizontal, or even more for very slow speeds. This inclination is not objectionable, as it does not interfere with efficiency of the lure, and it further exposes the hook.

It is preferred that the weight 22 be pivoted because it more completely exposes the hook when struck by a fish, or when slowed down by the action of the fish or fisherman, but the bottom member 11 may be weighted in other ways, as by extending its length or thickening it, or both, as illustrated in Figs. 4 to 7. In Figs. 4 and 5, weights 11′ are shown as extending from the rear end of the bottom member 11. In Fig. 6, the weight 22 is shown as supplemented by the added material 11″ on the plate in which the bearings for the pintle are formed. In Fig. 7, the weight is shown as formed by extending the length of the plate, as at 11‴.

These lures may be used for both bait casting and fly fishing. In the former a much heavier bait is required than for fly fishing. For bait casting different total weights are employed. The standard body may be used for either, it being necessary only to attach the proper weight to give the required total, although the body may, if desired, be made of any suitable weight.

For fly fishing the weight of the bait casting outfit would be excessive. In this case a proper balance may be obtained by making the parts thinner or of lighter material. The pivoted weight may be omitted and the weighted bottom member shown in Figs. 4 and 5 may be used. If preferred, the bottom member may be of uniform thickness and material, and the proper balance may be maintained by lengthening it to any suitable extent.

Where arms with decoys are used in fly fishing the lure has a tendency to turn over. I have found that by attaching a spoon 23 to the body by a swivel connection it further assists in making the hook ride in the desired position, while contributing to the attractiveness of the lure as a whole. If the device with this attachment turns over, the decoy arms may be removed or the hook may be reversed. The trailing spoon may be detachable.

Any suitable material may be used in the construction of my device. For fly outfits aluminum or an aluminum alloy is preferred. The body is usually stamped and the weight is cast. When the weight is rigid with the bottom member, the weight and bottom may be made in one or in two pieces.

A prominent feature of my invention is its adaptability to all circumstances. All the parts are removable from the body and from each other. The fisherman may by carrying with him a few extra hooks of different lengths and sizes, some with and some without hair or feather clothing in a variety of colors, together with a few decoy arms with different decoys and one or more bodies with or without the swiveled spoon attachment, form scores of combinations and subcombinations. I have already stated that in certain cases the snap or the decoy arms may be discarded. For fly fishing even the body may under some circumstances be dispensed with and the selected working parts will then be attached directly to the snap or the line.

In operation, due to the attached weight, the lure almost invariably strikes the water with the point of the hook uppermost. If otherwise delivered, it rights itself promptly. It retrieves easily, is attractive in action, and weedless in design.

Changes in the parts can be quickly made without tools.

Because the parts are separately removable and interchangeable with other equivalent parts different in color or shape, investment in a variety of complete lures is greatly reduced.

What I claim is:

1. A fish lure, comprising a body substantially U-shaped in vertical cross section, the lower arm of said body being longer than its upper arm and each of said arms having an opening adjacent the bend of said body, said openings being vertically aligned to receive means for attaching said body to a line, said arms being spaced apart to receive the shank of a fish hook therebetween with the eye of such hook in alignment with their openings.

2. A fish lure according to claim 1 wherein the lower arm of the U-shaped body is weighted at its rear end.

3. A fish lure according to claim 1 wherein the upper arm of the U-shaped body has a transverse slot adjacent its forward end through which the loop connecting a pair of decoy carrying arms may be inserted into alignment with the openings of the arms of the U-shaped body.

4. A fish lure comprising a body of substantially U-shape in vertical cross-section, each of the arms of which has an opening adjacent its forward end to receive line securing means and between which arms the shank of a fish hook may be inserted with its eye in alignment with said openings and its hook portion disposed at substantially a right angle to said arms and projecting beyond the rear ends of the latter, and means extending between the longitudinal edges of said arms for limiting the lateral swinging movement of such hook in either direction.

5. A fish lure according to claim 4 wherein the means which extends between the longitudinal edges of the arms of the U-shaped member to limit the lateral swing of a fish hook mounted between said arms comprises a pair of tongues each carried by one longitudinal edge of one of said arms.

6. A fish lure comprising a body substantially U-shaped in longitudinal vertical cross section, each arm of which has an opening adjacent its forward end through which means for securing said body to a line may be inserted, and a weight hinged to the rear end of lower arm of said body on an axle substantially parallel to the U-bend of said body.

7. A fish lure according to claim 6 wherein the upper arm of the substantially U-shaped body has an aperture adjacent its rear end through which the loop of a substantially V-shaped decoy carrier may extend.

8. A fish lure comprising a body of substantially U-shape in vertical cross section, each arm of which has an opening adjacent its forward end in vertical alignment with the opening of the other arm, the upper arm of said body having an aperture adjacent its rear end and the lower arm of said body being weighted at its rear end, a fish hook having its shank extending between said arms with its eye aligned with the openings in said arms and its hook projecting beyond the rear ends of said arms, a resilient wire bent between its ends into substantially V-shape, said wire having its bent portion lying between said arms in alignment with said openings and its divergent portions extending upwardly through and rearwardly of the aperture of said upper arm, and decoy devices carried by the divergent portions of said wire.

9. A fish lure according to claim 8 wherein one of the arms of the body has a tongue extending from each of its longitudinal edges toward the other arm for limiting the lateral swinging movement of the hook.

In testimony whereof I have hereunto set my hand.

EDWARD L. FARLEY.